United States Patent [19]

Foster

[11] 4,066,941
[45] Jan. 3, 1978

[54] MOTOR DRIVE CONTROL ARRANGEMENTS

[75] Inventor: Alan Foster, Hitchin, England
[73] Assignee: International Computers Limited, London, England
[21] Appl. No.: 567,197
[22] Filed: Apr. 11, 1975
[30] Foreign Application Priority Data
Apr. 11, 1974  United Kingdom ............... 16249/74
[51] Int. Cl.² .............................................. H02P 5/16
[52] U.S. Cl. .................................. 318/341; 318/603; 318/685
[58] Field of Search ............... 318/341, 603, 618, 685, 318/696

[56] References Cited
U.S. PATENT DOCUMENTS

| | | |
|---|---|---|
| 3,838,325 | 9/1974 | Kobayashi et al. ............. 318/341 X |
| 3,906,319 | 9/1975 | Milligan ............................... 318/341 |
| 3,950,682 | 4/1976 | Dohanich ............................ 318/341 |

Primary Examiner—B. Dobeck

[57] ABSTRACT

A motor drive system for driving a motor according to a predetermined motor speed curve in which a predetermined count of pulses of constant time increment is utilized to produce an output signal characteristic of an increment of motor movement. In addition the control signal is used to control the time interval between successive occurrences of the output signal in accordance with the motor speed curve.

8 Claims, 5 Drawing Figures

4,066,941

MOTOR DRIVE CONTROL ARRANGEMENTS

The present invention relates to motor drive control arrangements and in particular to such arrangements for controlling the velocity of electric motors.

SUMMARIES OF THE INVENTION

According to a first aspect of the invention there is provided a motor drive system for driving a motor in accordance with a required motor speed curve including; means for developing pulses of constant time increment; a pulse counter for producing from the pulses a control output; means for relating operation of the pulse counter to the drive of the motor; and means for utilising the control signal to cause the motor to undergo according to the motor speed curve, increments of motor drive movement.

According to a further aspect of the present invention there is provided a motor drive system for driving the motor according to a predetermined motor speed curve by energising the motor with successive increments of drive energy wherein a predetermined count of pulses of constant time increments is utilised to produce an output signal characteristic of an increment of motor drive increment, and wherein the output signals are further utilised to control the time interval between successive occurrences of the output signal in accordance with the motor speed curve.

It has been proposed to use various systems for motor speed variation control, and typically such systems operate on a closed loop. The present invention seeks to avoid the complexity and cost of the additional components previously proposed as signal feedback devices for closed loop operation.

BRIEF DESCRIPTION OF DRAWINGS

The present invention will now be described, by way of example, with reference to the accompanying drawings, in which.

DESCRIPTION OF PREFERRED EMBODIMENT

Figure 1:
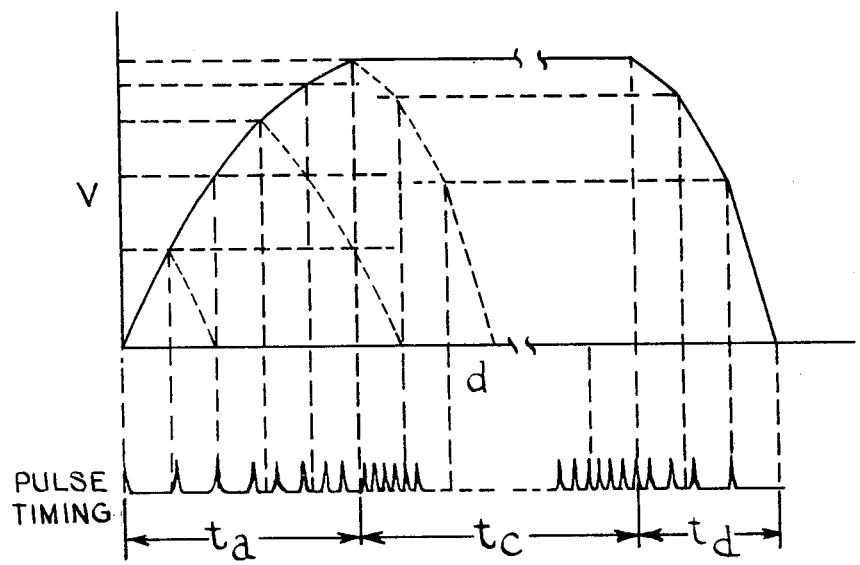
FIG. 1 is an idealised composite velocity and pulse timing diagram.

In applications of motor drive systems it is often a requirement that there shall be no sudden changes in speed such as are likely to cause shock to a load being moved. Thus, in these cases, it is desirable, to utilize the motor control arrangements which enable speed changes to be effected by gradual acceleration or deceleration periods as may be required. FIG. 1 shows a velocity diagram in which motor velocity V and thus load movement is plotted against increments of movement of a load being moved over distances $d$. It will be seen that during the acceleration period the velocity increases in a smooth curve from a minimum value (which may be zero, for example, indicating that the motor drive is starting from rest) to a maximum value, after which the velocity is constant. As will be seen, during the acceleration period, succeeding equal increments $d$ of distance are moved at ever increasing velocity, and consequently in ever decreasing time periods until the maximum speed is reached, and a constant velocity period commences during which succeeding increments $d$ of distance will then all require similar time periods. After the constant velocity period, the velocity is reduced and the figure shows a deceleration curve when the velocity is reduced to the original minimum value. It will be noted that the acceleration and deceleration time periods as shown in the Figure are different. Such a difference is frequently accounted for by the existence of friction so that the time required to accelerate a load is usually greater than that required to bring it to rest. It will be clear, however, that since it is possible to control the acceleration of a motor by, for example, controlling the application of drive current, it is also possible to modify the natural deceleration of the motor (that which arises on removal of the drive current) by supplying controlled amounts of drive current to the motor during the deceleration period. It is also to be noted that in many applications it is not necessary to involve a constant velocity phase in the motor drive cycle. In such cases it may be necessary to modify the accelerate-drive-decelerate cycle such that the motor can be brought to rest before a constant-velocity phase in its operation is reached. In FIG. 1 such modified acceleration-deceleration operations are indicated in the velocity curve by broken lines extending from the acceleration curve. It will be noted that the deceleration may be carried out either at a shortened or extended deceleration rate. In other words, the profile of the deceleration and acceleration curve may or may not be symmetrical.

It has previously been proposed to regulate the drive current for a motor by applying the drive current in pulsations, the frequency of the pulsations determining the effective drive current "seen" by the motor. It has also been proposed to utilise stepping motors as drive units and it will be apparent that the velocity of a stepping motor is directly dependent upon the frequency with which it receives drive current pulses. The pulse timing diagram of FIG. 1 shows in diagramatic form the manner in which motor velocity may be controlled by regulating the inter-pulse periods of drive current pulsations, and it will be seen that during the acceleration period $ta$, pulses $p$ are applied at a progressively increasing frequency, so that the inter-pulse periods are progressively shorter. During the constant velocity period $tc$ the pulses $p$ are applied at a constant frequency so that the inter-pulse periods are constant, and during the decelerative period $td$, the pulse $p$ are applied at a progressively reducing rate so that the interpulse periods are progressively longer.

Figure 2:
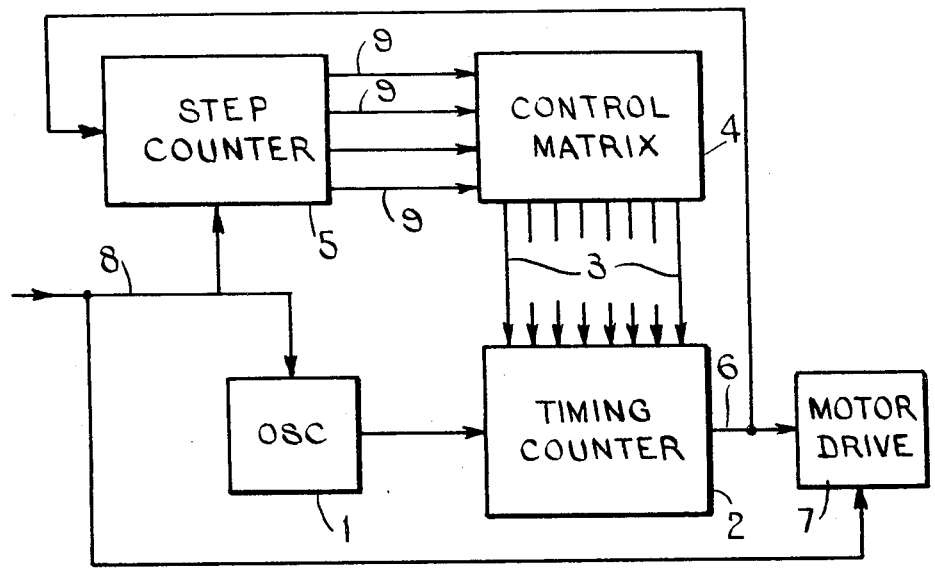
FIG. 2 is a simplified schematic diagram of a motor speed control system.

FIG. 2 shows in schematic form a system for regulating the interpulse periods of a train of pulses suitable for use as to control the effective drive current of a motor so as to enable control of the motor drive in the manner outlined above. An oscillator 1 is arranged to deliver constant frequency pulses to a timing counter 2. The timing counter 2 has a further group of input lines 3 connected to a control matrix 4, the lines 3 carrying signals from the matrix 4 to preset as required the initial count in the counter 2. The control matrix is connected by lines 9 to a step counter 5 which causes the matrix 4 to select different combinations of lines 3 to represent different preset values. A carry output line 6, from the timing counter 2 is connected to the step counter 5 and to the motor drive circuitry 7. The whole arrangement is set into action in response to a start signal applied over a line 8 from for example, a computer.

The start signal sets or resets the step counter 5, prepares the motor drive circuitry 7 and starts the oscillator 1. The oscillator 1 generates pulses at a frequency greater by a factor of say $r$, than the lowest frequency of pulses required. The counting capacity or effective radix of the timing counter 2 is made equal to $r$, so that, in the absence of a preset value the counter 2 produces an overflow or carry output pulse or signal on the line 6 once for every $r$ input pulses. Thus, in the absence of a preset value the counter 2 recycles continuously and produces carry output pulses spaced at the required maximum interpulse period, the carry output pulses being passed directly to the motor drive circuitry 7.

Thus, following the start signal, the step counter 5 is set to zero and all selection lines 9 to the control matrix 4 are released, with the result that no preset value is specified by the matrix 4. Consequently the first carry-output signal on line 6 occurs after the maximum interpulse period. This first carry-output signal is also applied to step the step counter 5 to a count of one, and the first of the output lines 9 from the counter 5 then carries a signal. The control matrix 4 is for example, a diode matrix in which sets of row and column lines are coupled selectively by diodes. Thus, if a particular row line 9 is selected to carry, say, a low signal, those column lines 3 which are connected by diodes to the selected row line 9 also go low, while the remainder of the lines 3 remain high. Thus the selection of the different row wires 9 in succession or combinations of wires 9 as the count in counter 5 is advanced produces successively different preset values on the lines 3 which values are applied to the timing counter 2. The entry of a preset value into the counter 2 causes shortening of the time period before the next carry-output pulse is generated by a time interval equal to that occupied by a number of oscillator pulses equivalent to the number of pulses then necessary to produce a carry output. Thus, the choice of diode connections within the matrix 4 enables the selection of successive lines 9 in response to successive carry-output pulses to so select preset values on the lines 3 that any required succession of inter-pulse spacings of signals on the line 6 may be obtained, permitting, for example, a motor drive cycle consisting of an acceleration phase, followed by a period of constant velocity, followed by a deceleration phase.

Figure 3:
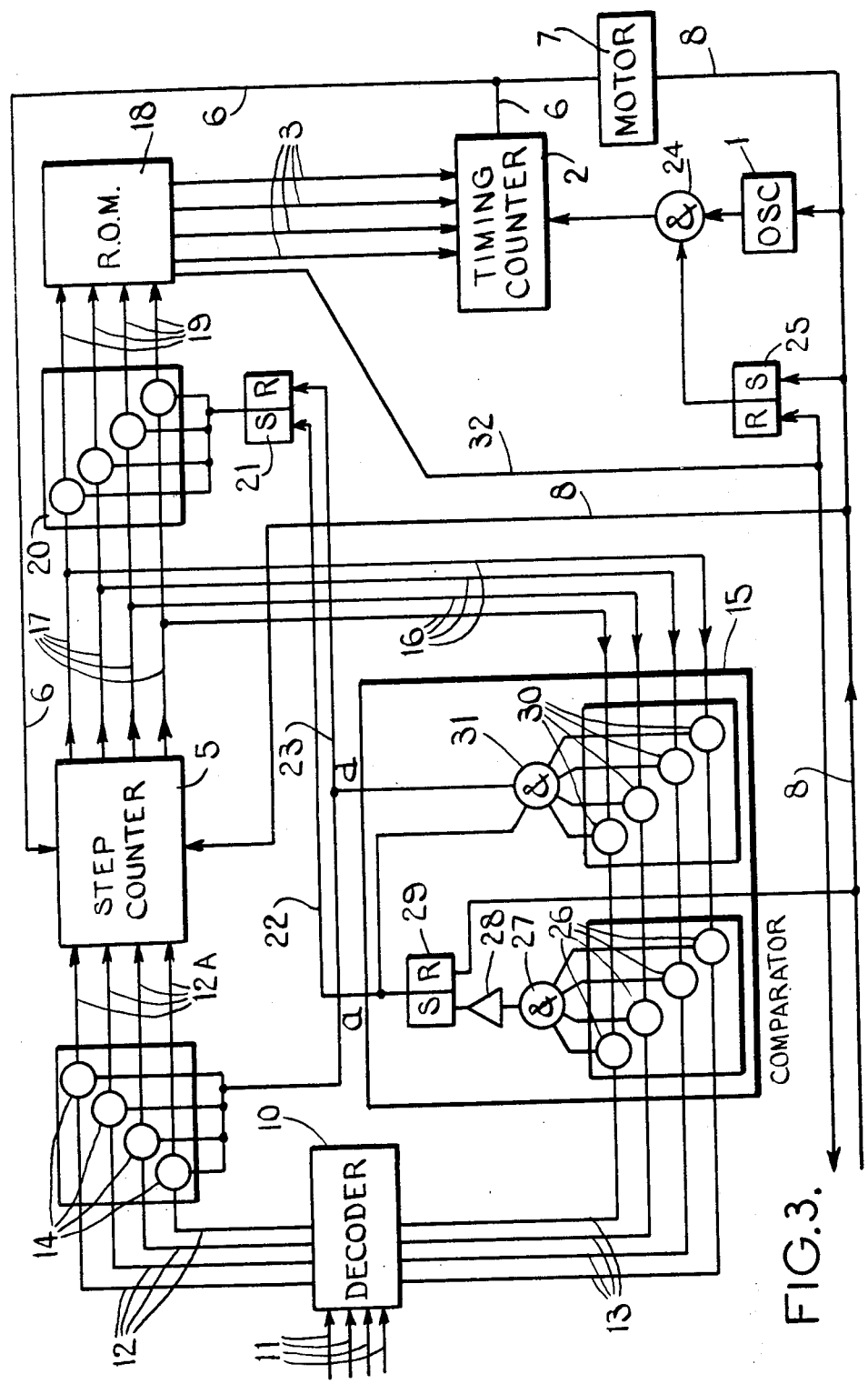
FIG. 3 shows a stepping motor speed control arrangement.

In practice, the critical phases for motor speed control are usually the acceleration and deceleration phases. Furthermore, where the duration of total movement is variable, it becomes necessary to devote a considerable amount of the matrix merely to produce a series of unvarying preset values to cover the period of constant velocity and further complex circuitry to adjust the number of constant velocity steps to cater for varying degrees of total movement. An alternative version of the basic arrangement of FIG. 2 will now be described in connection with a speed control arrangement particularly suited for the control of a stepping motor in a paper feeding environment. Such an arrangement is shown in FIG. 3.

Figure 4:
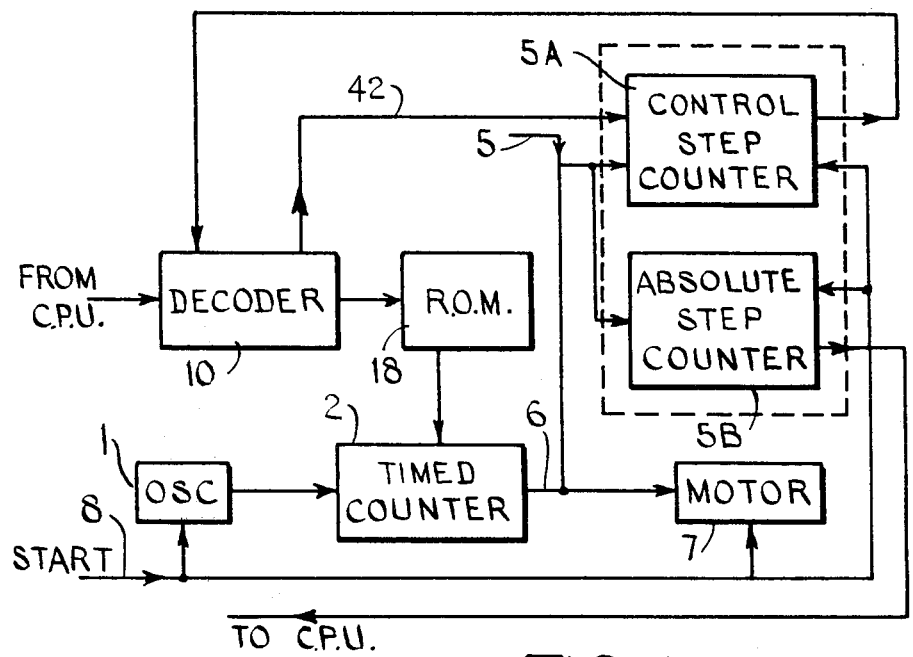
FIG. 4 is a simplified schematic diagram of a second embodiment of a motor speed control system and FIG. 5 is a simplified schematic diagram of a further embodiment of a motor speed control system.
Figure 5:
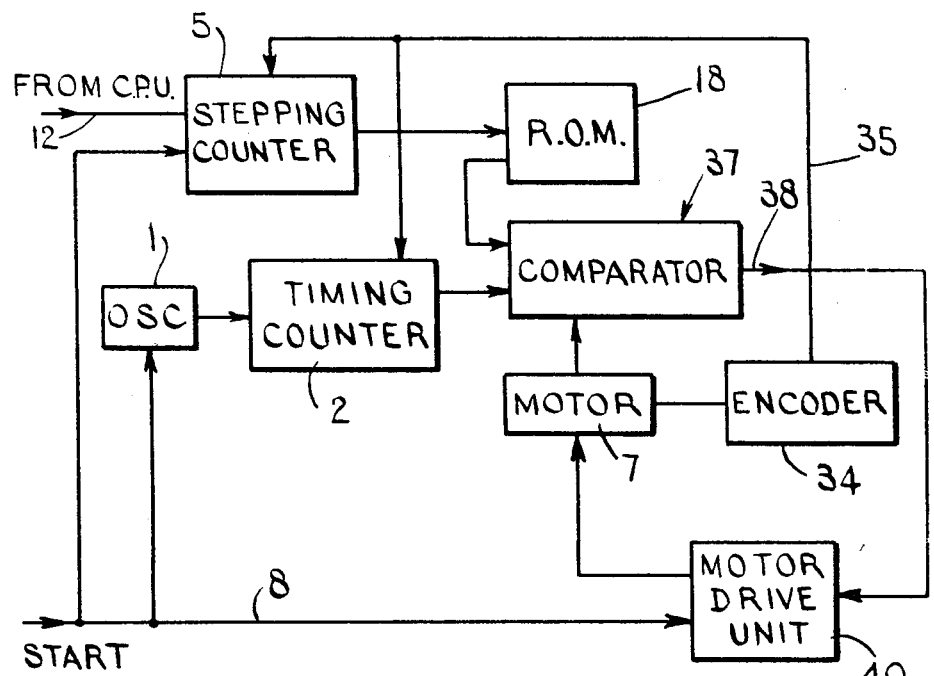

Paper feeding devices are frequently required, for example, in connection with line printers such as are commonly used for presentation of printed matter output from a computer. In such printers, the paper feed devices, such as tractors, are driven by electric motors to bring required line positions on a paper web into registration with a printing line in the printer mechanism. After a line has been printed, the paper must then be advanced to a new printing position, which advance is usually specified by the computer in terms of "number of print lines through which the paper is to be moved." It is in connection with such a paper feed using a stepping motor that the arrangements of FIGS. 3, 4 and 5 are to be described. The line spacing on computer print-out paper is usually six or eight lines per inch, and it is therefore convenient to choose an arrangement which includes motor drive gearing to set the drive conditions such that a stepping motor drives a tractor mechanism to provide 48 steps per inch of paper movement. Thus, for one-eighth-inch line spacing the motor is required to perform six steps for each print line, and for one-sixth-inch spacing, eight motor steps are performed for each print line. Hence, it will be realised that only a simple translation is required for the computer to specify paper feed movements in terms of motor steps rather than print lines. This translation is conveniently performed in a look-up table decoder of conventional form which, for each specified paper feed movement, is arranged to specify the lengths of the different phases of movement in terms of the numbers of motor steps required.

The arrangement will now be described with reference to FIG. 3 in which the table-look-up translator referred to above is shown as a decoder 10 which receives the paper feed data from the computer (not shown) over a group of lines 11. The decoder 10 provides two outputs each representing totals of motor steps required over lines 12 and 13 respectively. The lines 12 are connected by way of AND gates 14 to presetting inputs 12A of the step counter 5. A comparator 15 is used to compare the input of the step counter 5 with the output of the step counter 5. The lines 13 are used to apply the decoder output as one set of comparison inputs of the comparator 15, whose other comparison inputs 16 are connected to receive the count of the step counter 5 which appears on the line 17. The output from the step counter 5 is, in this example, preferably expressed as a group of binary address selection signals for use in conjunction with a read-only memory 18 which replaces the control matrix 4 of FIG. 2.

The read-only memory 18 is an information store having a number of addressable locations each of which holds a presetting value together with an addressing arrangement capable of registering a required address and selecting the contents of that address. Hence, in response to addressing signals received from the step counter 5 by way of the output lines 17 of the step counter, and input lines 19 of the memory 18, the addressed location in the memory 18 is read out and the resultant presetting value from the memory 18 is applied over lines 3 to the timing counter 2. The connection of the lines 17 from the step counter 5 to the input lines 19 of the memory 18 is interrupted by AND gates 20 which are controlled by a bistable 21 controlled by output lines 22 and 23 from the comparator 15. The output line 23 from the comparator 15 also controls the presetting input gates 14 of the step counter 5. The step counter 5 is advanced, as previously described, by carry-output pulses from the timing counter 2 over line 6, which are also connected to the motor drive circuit 7. The motor drive circuit in this case is a known arrangement in which a logic network controls the stepping of a pattern of energisation applied to the pulses of a stator in regular procession around the stator coils to produce stepwise rotation of the motor rotor. Each pulse from the timing counter 2 over the line 6 counter, the pattern to be advanced by one step.

The oscillator 1 is, in the present case, free-running, but its output to the timing counter 2 is controlled by an AND-gate 24 which is, in turn, controlled by a bistable 25. The bistable is set, in response to a start signal applied over line 8, to open the gate 24 and is reset, to close the gate 24, by an end-of-operation signal obtained from the memory 18. The start signal on line 8, also prepares the motor drive circuit 7 starts the oscillator 1 and resets the stop counter 5. The end-of-operation signal which could if desired, be used to reset the step counter is available as a feed-back signal to the computer indicating the end of run conditon.

Three modes of operation of the control arrangement of FIG. 3 are possible, in dependence upon the relative lengths of the accelerate and decelerate phases of the motor drive requirements. For example, in one mode the full acceleration phase is required followed by a period of constant velocity before a full deceleration phase. A second mode which is similar, save that no period of constant velocity intervenes between the accelerate and decelerate phases, while in a third mode, less than a complete phase of acceleration is to be followed by a shortened decelerate phase.

The first operational mode will now be described in detail. Receipt of a start signal opens AND-gate 24 conditions the motor circuit 7 starts the oscillator and resets the step counter 5. The timing counter 2 commences to accumulate pulses. When a carry output is generated a drive pulse is applied to the motor drive 7, and in addition the step counter 5 is caused to advance on receipt of the pulse, thereby producing an output on the lines 17 which is applied to the inputs 16 of the comparator 15.

At the time of providing the start signal the computer also provides a "length of feed" input over lines 11 to the decoder 10 which provides from the information a value, equal to the number of acceleration phase steps plus the number of constant velocity steps, to the lines 13. The decoder 10 also provides, for every feed length that requires a full deceleration phase, a value on lines 13 that corresponds to the address in the memory 10 that contains the first preset value for the deceleration phase.

At this point the bistable 21 is in its reset condition so that the gates 20 are opened to connect the step counter output lines 17 with the memory input-lines 19. The step counter 5 output is applied to the lines to select the first preset value for an acceleration phase from the memory 18. This preset value is applied to lines 3 and presets the counter 2 with an initial pulse count so that the next carry output is generated after a shorter time interval because fewer pulses have to be received before the carry output generation. This process is repeated throughout the acceleration phase, each interpulse interval being shorter than the last.

Within the comparator 15 the output from the step counter 5 is compared with the end of acceleration signal pattern which is obtained from the decoder 10 and applied to the comparator 15 along the lines 13. The comparison is effected in a group of AND-gates 26, whose outputs are applied to a further AND-gate 27. The latter's output is used to set, by way of a unit time delay 28, a bistable 29. The combination of the gates 26, 27 and the bistable 29 serves to produce an end of acceleration output signal $a$ over the line 22 to set the bistable 21 when the acceleration phase is at an end. This bistable is reset, conveniently, by the start signal. In practice the signal '$a$' is generated when the step counter output on line 16 is one less than the number of steps in the acceleration phase.

This takes into account the fact that the motor has already executed a step before the first carry output is produced and also the fact that control action has to be initiated before the completion of the phase of operation.

The output on the line 22 sets the bistable 21 which actuates the gates 20 so as to isolate the counter output from the memory 18 addressing registers (not shown). Consequently the memory output remains constant thereby applying a constant input along lines 3 to the timing counter 2, so that the time interval between the production of the carry output signal remains constant as the preset value in the timing counter remains unchanged. Throughout this period the motor is driven at a constant velocity.

The step counter, however, continues to accumulate the carry output signals from the line 6, so as to provide on the lines 16 an indication of the total count of the motor steps performed. The signals on the line 16 are compared in the comparator with the output from the decoder 10, this output being indicative of the total number of steps required. In the comparator the decoder output is compared with the step counter output in a group of AND-gates 30 whose outputs are applied to a further AND-gate 31. This gate 31 is also connected to receive a further input from the end of acceleration output 22 whereby the gate 31 is only enabled after the setting of the bistable 28. The output from the gate 31 serves as an indication of the end of the constant velocity phase and on indication of the commencement of the deceleration phase. This output signal is applied over the line 23 to reset the bistable 4.

The resetting of the bistable 21 opens the gates 20 so that the step counter output is once again fed to the memory 18.

At the same time the signal 'd' opens the gate 14 so that the signals decoded from the computer input on line 11 can be applied to the step counter via the lines 12. The signals along the lines 12 represent the total number of steps necessary for the deceleration phase, and serve forceably to set the counter 5 to the new value which repesents the address of that location in the memory that holds the first preset value for a full deceleration phase. During the operation of the deceleration phase the step counter 5 produces an output which represents for each step the relevent deceleration step. In other words the timing counter continues to undergo its cycle and the time intervals between the outputs on the line 6 increase thereby progressively decelerating the motor.

It will be realised that the address of the final preset valve to be applied to the timing counter 2 must be known and this can be produced by means of the signals applied on the lines 12, particularly where the counter 5 includes the facility of being able to count up and down. It is to be noted that the counters although illustrated are single unit and can in practice include, a counting up and down counter unit for the acceleration and deceleration phases and a further counting unit for use with the constant velocity phase.

It will be understood that by resetting the counter 5 at the commencement of the deceleration phase readily facilitates having a deceleration phase with a different profile from that associated with the acceleration phase.

At the end of the deceleration phase the memory 18 produces an output signal along the line 22, which is effectively an end of operation signal c. This operation complete signal resets the bistable 25 to close the AND-gate 24 and brings the operation to an end, and also provides a control on the line 22 for the computer to signify the end of the complete feeding operation.

The second case of operation to be considered is that when a full acceleration phase is to be followed by a full deceleration phase without a constant velocity period intervening. The operation of the arrangement throughout starting and acceleration is as described above, the lines 12 from the decoder carrying a value representing the address of the first deceleration step while the lines 13 carry a value which is equal to the number of acceleration phase steps since the number of constant velocity steps is zero. Thus, one step before the end of acceleration, the signal 'a' on line 22 from the comparator 15 is produced. On the next step, however, the comparator produces the signals 'd' over the line 13 because on this step the value on the lines 13 is equal to the step count on lines 16. Thus, the bistable 21 which controls the gates 20 to isolate the memory 18 address lines from the step counter 5 is set only for one step at the end of the acceleration phase and is then reset to allow the selection of the preset value for the first deceleration step. The remainder of the operation is as previously described.

In the third case to be considered the acceleration phase is incomplete and the value on the lines 13 which would normally specify the number of acceleration steps required, would be less than the value at which the signal 'a' is normally generated.

The signals on the lines 13 therefore carry a value which is effectively equal to the compliment of the steps required so that by the time the required acceleration phase has been carried out the signals on the line 13 correspond to that which would, on a full acceleration phase, produce the output a from the comparator 15, this accuring one step before the actual end of the required acceleration phase.

The lines 12 from the decoder 10 specify a value derived from the lock-up table which represents the address of the store location which contains that deceleration step corresponding to the point on the velocity curve (FIG. 1) reached during the acceleration phase. Thus, the comparator 15 produces the signal 'd' when the required number of acceleration steps have been performed and the presetting gates 14 are opened to switch the store selection directly to the required deceleration step. The remainder of the operation is as previously described.

While it is convenient to use a read-only memory to store the presetting values it is clearly not necessary that this kind of memory unit be used. Consideration will show that the reading-out of a predetermined succession of storage locations, where each location is associated with a particular step, actually provides a sequence of values each of which is proportional to a time interval represented as a multiple of time increments which are themselves determined by the frequenies of the pulses generated by the oscillator 1. It will then be apparent that, by presetting the timing counter 2 with the values read out and utilizing the carry-out signal generated as the radix of the counter 2 is exceeded, the values to be stored in the memory are the complements of the time intervals actually required. It will be obvious that the actual values could be used and the counter decremented to zero to produce the same result. Because the acceleration and deceleration sequences of values are quite separate, the addressing may be simplified by using a pair of smaller memories one for the acceleration sequences and the other for the deceleration sequence. In this case, both sets of addresses could start from, say, one, and the 'a' signal would then switch the address lines away from the acceleration memory. The 'd' signal would then switch the lines to the deceleration memory, the decoder lines 32 carrying suitably modified addres values.

The arrangement of FIG. 3 is, as described, used in connection with a stepping motor and it is assumed that such a motor will always step in response to an energising signal. It is possible to check that a motor has actually responded to a drive impulse by modifying the input to the step counter 5. Thus, if the step signal is obtained from, for example, a shaft encoder on the motor itself, a step counter input will be obtained for each completed increment of movement of the motor.

FIG. 4 illustrates in schematic form a second embodiment of a system for regulating the inter-pulse periods of a train of pulses used to drive a stepping motor.

In the figure components similar to those used in relation to FIGS. 2 and 3 will receive the same reference numerals.

As is the case of FIGS. 2 and 3 an oscillator 1 applies timing pulses of constant frequency to a timing counter 2 which produces a carry-output on an output line 6 to provide signal an energising signal for a motor control circuit 7 and input for the stepping counter unit 5. The count in the timing counter 2 can be preset for the purposes discussed in relation to the previous embodiments by signals characteristic of predetermined pulse counts produced in a memory 18 and applied to the counter over lines 3.

The memory 18 is addressed by address signals received from a diode circuit 10 which receives primary control data from a computer. The counter unit 5 includes a control step counter 5A and an absolute step counter 5B. The control system counter produces position signals which are applied to the decoder 10 and receives energising signals from the time counter 2 over line 6. The absolute counter 5B, produces an output signal which is indicative at all times of the total number of steps made by the motor 7, and which is applied to the computer as a feed back information signal to the computer.

In operation the start signal 8 starts the oscillator 1, conditions the motor drive circuits, and resets the counter unit counters 5A and 5B. The oscillator feeds pulses to the timer counter 2, which after counting up to the overflow level produces the carry-output which is applied to the motor circuitry 7, 7, and to the counters 5A and 5B.

The first carry-output occurs after the maximum inter-pulse periods, and causes the counters 5A and 5B each to produce an output-pulse. The pulse from the counter 5B is applied to the computer as an absolute indication of a motor step. The output from the counter 5A is applied as an inpput to the decoder unit 10 which also receives from the computer signals relating to the required speed or profile of the motor drive curve.

The decoder derives from these signals decoded address signals which are applied to the memory 18 to cause the latter to produce an output characteristic of the preset count which is applied to the timer counter 5. Since the step counter output signal is applied to the decoder 10 the latter is effectivvely strobed by the stepping counter so that the timing counter presetting signals obtained from the memory are related to the motor position and the speed profile stored in the memory.

The output from the decoder produces signals which are indicative of the end of an acceleration phase and which are able to stop the step counter by way of line 42 so as to enble the previously described constant speed phase of a control to be effected without imposing a very high demand on memory storage space full stop.

The input from the computer to the decoder provides the information for terminating the constant velocity phase and commencing the deceleration phase. The output from the absolute step counter 5B is used to provide data for the computer so that the latter will produce feed control signals for the decoder at the required points on the motor speed control curve.

FIG. 5 illustrates how the present invention may be applied to the control of continuously rotating motor as opposed to a stepping motor by modifying the couplings between the timing counter 2 and the memory 18 in the following way.

In FIG. 5 components similar to those depicted in previous Figures are given the same reference numerals.

The movement pulses from a shaft encoder 34 are appled by a line 35 to the timing counter 2 as well as to the step counter 5. The step counter 5 selects successive memory addresses to be read out and as before, these addresses each contain a value repesentative of the time increments applicable to the corresponding motor movement increment.

The movement pulses connected reset the timing counter to zero, so that immediately before each movement pulse, the timing counter registers the number of time increments actually taken for the current motor movement. Hence, comparison in a digital comparator 37 connected between the timing counter and the memory of the values from the timing counter 2 with the values from the memory 18 will indicate whether the current motor velocity is too high, too low or just right. To this end the digital comparator 37 has "greater-than," "equal-to" and "less-than" outputs 38. For convenience the value from the counter and memory may be strobed into the comparator 37 by the pulse directly from the shaft encoder, this pulse being slightly delayed before being applied to the remainder of the system. The output signals from the comparator are used to adjust the drive current permitted.

This is illustrated by a control connection 39 between a motor drive unit 40 which provides motor drive current to flow through the motor. This drive unit conveniently includes a group of impedance paths (not shown) each containing a switching element such as signal corresponding to said areas of a transistor in the motor current path. The outputs 38 from the comparator are then used to control switching of the transistors to vary the permitted current.

The circuit has a start line 8 which conveniently resets the stepping counter, starts the oscillator and starts the motor drive.

It will be seen that in all the foregoing examples a memory device is used to contain a susccession of values representing time intervals expressed as multiples of a predetermined time increment. The different values are each related to different particular ones of increments of movement of the motor and are read out in succession from the memory, one for each movement increment. The values of the succession are proportionate to a required velocity variation curve and are used to control the motor speed to conform to that curve.

I claim:

1. A motor drive control arranged to control the speed of a motor in accordance with a predetermined velocity variation curve including: a memory device including a plurality of addressable storage locations respectively containing different stored values relating to required increments of movement of the motor; a step counter operable to address the storage locations of the memory device, the location addressed being determined by the contents of the step counter; means operative to increment the step counter for each incremental movement of the motor to read out the values from the memory device relating respectively to the required increments of movement of the motor; and drive means responsive to the values read out from the memory device to supply drive current to the motor so as to cause the motor to move in accordance with the predetermined velocity variation curve.

2. A motor drive control as claimed in claim 1 in which the drive means includes a pulse generator operable to produce a sequence of drive pulses, each of which drive pulses is effective to produce an incremental movement of the motor, and each drive pulse occurring at a time interval after the preceding drive pulse determined by the stored value read out from the memory device.

3. A motor drive control as claimed in claim 2 in which the pulse generator is operative to increment the contents of the step counter in response to each drive pulse generated.

4. A motor drive control as claimed in claim 2 in which the pulse generator includes a counter responsive to pulses generated by a constant frequency oscillator and arranged to generate one of said drive pulses each time the count reaches a predetermined level, the counter also being responsive to the stored values read out from the memory device, said stored values being effective to modify the time intervals between the drive pulses.

5. A motor drive control as claimed in claim 2 including a first comparator operative in response to a first predetermined relationship between a first reference signal and the contents of the step counter to render the memory device inoperative to change the time intervals between successive drive pulses whereby the drive pulses are generated at uniform time intervals and the motor is driven at a constant velocity.

6. A motor drive control as claimed in claim 3 including a second comparator operative in response to a second predetermined relationship between a second reference signal and the contents of the step counter to set the step counter to be effective to address the first of a series of preselected locations in the memory device containing a series of values relating to deceleration of the motor and in which incrementing of the contents of the step counter by the drive pulses is effective to read out the series of values sequentially.

7. A motor drive circuit as claimed in claim 4, and including a decoder means having an input connected to receive from a data processing means information relating to a desired motor drive profile and an output connected to the input of the memory device; an additional step counter responsive to output from the means for incrementing the first mentioned step counter, and providing an output characteristic of an absolute count of counter steps to the data processing means, said decoder being so responsive to the output from the first mentioned step counter as to cause the memory device to read out said stored values relating to the required increments of movement of the motor.

8. A motor drive circuit as claimed in claim 4, and including an encoder responsive to the movements of the motor and adapted to produce a control signal output which is applied to the pulse counter so as to reset the latter to zero, whereby the pulse counter registers the number of time increments required for a desired motor movement; the circuit also including a comparator operative in response to both the pulse counter output and the memory device output to produce, a selected relevant one of a group of outputs indicative of preselected velocity conditions of the the motor said velocity conditions including velocity too high, velocity too low and velocity just right.

* * * * *